Oct. 17, 1961  H. M. A. SALOMONSSON  3,005,148
VOLTAGE DERIVATION NETWORK

Filed June 13, 1957  2 Sheets-Sheet 1

INVENTOR.
HANS MANNE ALVAR SALOMONSSON
BY Hauss and Wydick

ATTORNEYS

Oct. 17, 1961  H. M. A. SALOMONSSON  3,005,148
VOLTAGE DERIVATION NETWORK
Filed June 13, 1957  2 Sheets-Sheet 2

INVENTOR.
HANS MANNE ALVAR SALOMONSSON
BY Hane and Nydick
ATTORNEYS

United States Patent Office 3,005,148
Patented Oct. 17, 1961

3,005,148
VOLTAGE DERIVATION NETWORK

Hans Manne Alvar Salomonsson, Stockholm Sv, Sweden, assignor to Aktiebolaget Bofors, Bofors Sweden, a Swedish company
Filed June 13, 1957, Ser. No. 665,554
12 Claims. (Cl. 323—74)

The present invention relates to electric or electronic servo systems, and more particularly to servo systems having an error-signal channel including a derivation network.

In servo systems of the general kind above referred to, either A.-C. or D.-C. signals may be utilized and fed to the error-signal channel of the system. If A.-C. signals are used, the error signal channel generally comprises an A.-C. amplifier, a phase detector, an equalizing filter network, a D.-C. amplifier and a servo motor, and when D.-C. signals are used, the error signal channel generally includes an equalizing filter network, a D.-C. amplifier and a servo motor. In both kinds of error signal channels the circuit components are connected in series in the aforelisted order.

Servo systems including error signal channels of the kind above referred to, are described, for instance, in United States Patent 2,771,573.

In order to avoid oscillations at the adjustment of the servo system, the latter further comprises a derivation network which in either kind of channels is connected prior of the D.-C. amplifier. Such a derivation network generally comprises a series branch including a capacitative means and a resistive means connected in parallel and a parallel branch including a resistive means. The restraining or braking effect of such derivation network can best be apprehended by a so-called phase plan for the servo system. In such phase plan the y-axis is calibrated in units of speed and the x-axis in degrees of angle. The action of the derivation system is represented by a line extending through the zero point of the co-ordinate system. Any point along said line then indicates that the signal supplied by the error signal channel imparts zero acceleration to the servo system. When a movement line is entered in the phase plan, that is, a line representative of the relationship between the angular error of the servo system and the rate of change in the angular error such line will commence at the x-axis and after a certain reduction of the angular error will intersect the straight line representative of the derivation network whereupon the movement line will closely approach the straight line.

Such attitude of the movement line subsequent to the intersection of the straight line is not an advantageous one as it indicates that the servo system will not adjust itself with the desired rate of speed. In order to attain the desired speed of adjustment, the line representing the effect of the derivation network, which may also be designated as braking or change-over line is preferably a curved configuration conforming to, or as closely as possible to a parabel.

Accordingly, the principal object of the present invention is to provide a servo system of the general kind above referred to, in which the braking line has a curvature representing as closely as obtainable the form of a parabel.

The aforementioned object of the invention and further objects, features, and advantages which will be pointed out hereinafter are attained by providing a servo system having an error signal channel carrying as error signal a modulated carrier-wave signal and a derivation network included in the D.-C. part of the error signal channel, which derivation network comprises a series branch including a capacitative circuit component and a resistive circuit component connected in parallel and a parallel branch including a circuit component having a non-linear characteristic and a resistive circuit component connected in series.

According to a further development of the invention several additional branches may be provided, each including a non-linear circuit component and a resistive circuit component, each of said additional branches being connected in parallel with the resistive circuit component of the preceding parallel or additional branch.

According to a still further development of the invention, the resistive circuit component in the parallel branch of the derivation network and/or the resistive circuit components in the additional branches are of zero value.

In the accompanying drawing a preferred embodiment of the invention is shown by way of illustration and not by way of limitation.

Figure 1:
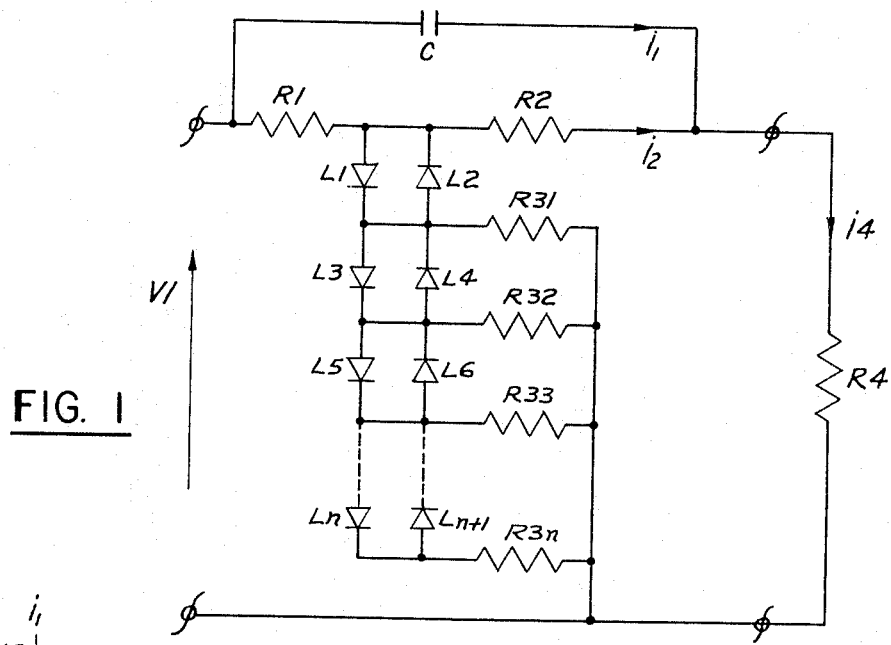
FIG. 1 is a schematic circuit diagram of a derivation network according to the invention.

Referring now to the figures in details,

FIG. 1 shows as derivation network a filter network having a series branch and a parallel branch. The series branch comprises a capacitator C connected in parallel with two resistors $R_1$ and $R_2$ which in turn are connected in series. The parallel branch of the network is connected at one end to the junction point between resistors $R_1$ and $R_2$. The parallel branch comprises two rectifiers $L_1$ and $L_2$ connected in parallel and the junction point of the two rectifiers is connected in series with a resistor $R_{31}$. The two rectifiers are connected in opposition. The filter network as just described, represents a derivation network according to the invention in its most simple form. As is evident, circuit component C is shown as a capacitator to simplify the illustration. It may be any suitable circuit component having capacitative properties. Similarly, circuit components $R_1$, $R_2$ and $R_{31}$ are shown as resistors to simplify the illustration, but they may be any suitable component having resistive properties. The rectifiers $L_1$ and $L_2$ may also be replaced by other components having a non-linear characteristic and finally resistors $R_1$ and $R_2$ may be combined in one unit which is tapped at an intermediate point.

The network also comprises a resisitive circuit component shown as a resistor $R_4$ which is connected in parallel to the parallel branch of the network.

The entire filter network should be visualized as being connected directly ahead of the D.-C. amplifier of an error signal channel of either kind previously described.

In servo systems of the general kind herein referred to, the magnitude of the error signal voltage corresponds to the magnitude of the angular error and the time derivatives of said voltage to the changing speed of the angular error. Hence, the angular error may be designated as the error voltage $V_1$, and the derivatives of the angular error as the time derivatives of the error signal voltage.

Figure 2:
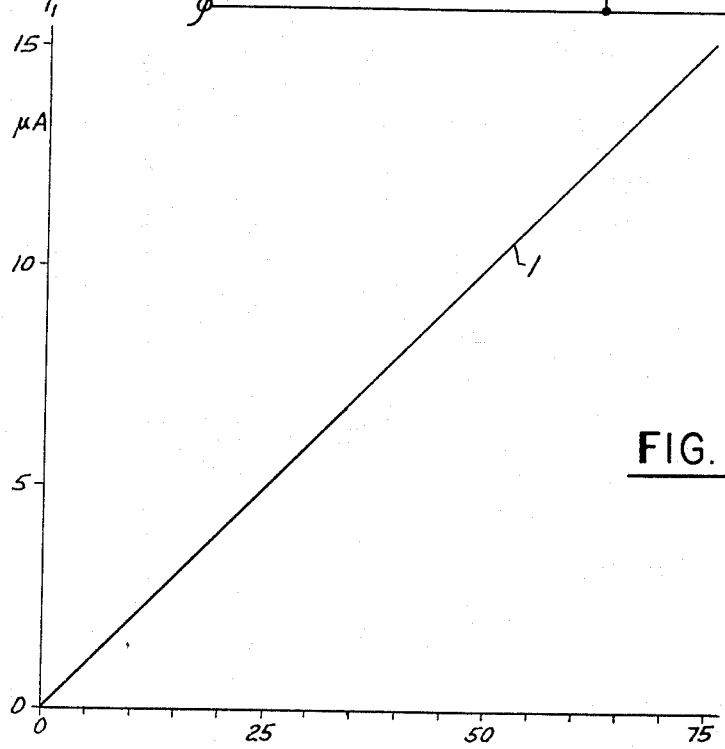
FIGS. 2, 3, 4 are graphs of the phase plan for the derivation network according to the invention in a phase plan.

The graph line 1 of FIG. 2 is obtained by plotting the current $i_1$ through capacitator C as a function of the time derivatives of the error signal voltage, more specifically, current $i_1$ is plotted along the y-axis and the derivatives of the error signal voltage are plotted along the x-axis.

Figure 3:
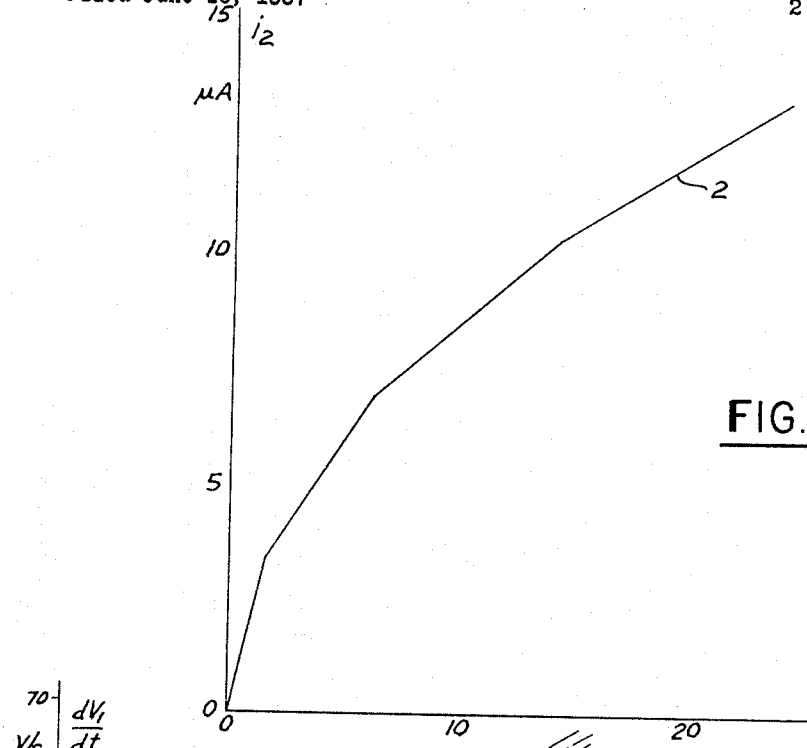

The graph line 2 of FIG. 3 is obtained by plotting the current $i_2$ through the resistor $R_2$ as a function of the error signal voltage. Again, the current $i_2$ is plotted along the y-axis and the error signal voltage is plotted along the x-axis.

It should be noted that the filter system as heretofore described, yields only the lowest two line sections of graph line 2, that is, the lowest part of the graph line has a fixed length whereas the succeeding sections of the graph line are of unlimited length.

Figure 4:
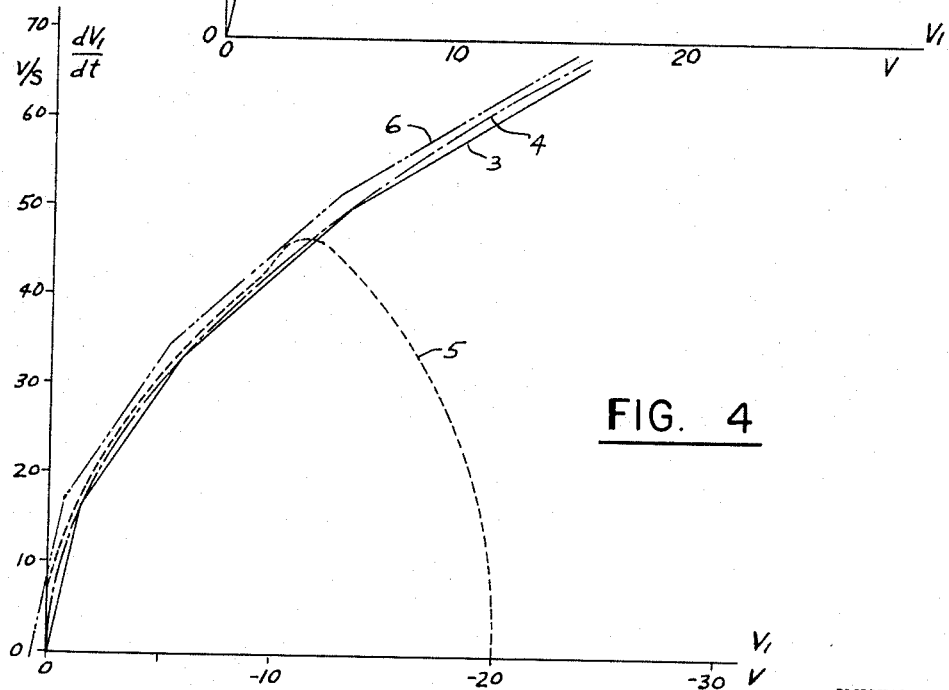

FIG. 4 shows the braking line 3 of the filter which is derived from graph lines 1 and 2 of FIGS. 2 and 3. The braking line is shown in a phase plan in which the time derivatives of the error signal voltage are plotted along the y-axis and the error signal voltage along the x-axis. The braking line of the filter network as hereinbefore described, consists of the two lowest sections of graph line 3. As was explained in connection with FIG. 3, the following sections of the graph line 3 have an unlimited length as yet.

The braking line presents the line along which the error signal channel produces zero signal voltage, that is currents $i_1$ and $i_2$ are of equal magnitude but have opposite signs. As pointed out before, it is desirable that the braking line has, or approaches as closely as attainable, the configuration of a parabel. Such a desired braking line is shown in FIG. 4 as graph line 4. By introducing a knee between the two lowermost sections of the braking line due to the action of the aforedescribed filter network, the braking line approaches the parabel configuration more closely than does a straight line.

If now a movement line is entered in the phase plan, that is, the line which represents the time derivatives of the angular error as a function of the angular error, it will be seen that the movement line originates at the x-axis, but rises until it intersects the braking line—in the illustrated graph the extended portion of the second lowest section of graph line 3, whereupon the movement line approaches or closely hugs the braking line.

The basic filter or derivation network as hereinbefore described, may be refined by connecting in parallel with resistor $R_{31}$ an additional branch again including a circuit component having a non-linear characteristic and a resistive circuit component connected in parallel. The non-linear component is shown as comprising two rectifiers $L_3$ and $L_4$ connected in parallel with each other and in opposition. The rectifiers are connected in series with a resistor $R_{31}$.

The effect of the additional branch is to produce a second knee at the end of the second section of the braking line 3 so that this line has now three distinct line sections. Any number of additional knees in the braking line may be obtained by providing further additional branches of the kind previously described. An additional branch including two opposed parallel rectifiers $L_5$, $L_6$, and a resistor $R_{33}$ connected in series is shown. The designations $L_n$, $L_n+1$ and $R_3n$ indicate the theoretically unlimited number of additional branches. As is apparent, the more additional branches are provided, the more bending knees are formed in the braking line whereby the same approaches very closely the desired configuration of a parabel.

It is also apparent from the fact that the graph lines 2 and 3 in FIGS. 3 and 4, respectively, are shown with three knees that signify two additional branches are connected to resistor $R_{31}$. FIG. 4 further shows a movement line 5 for a filter having two additional branches connected to the parallel branch. This line similar to the aforementioned movement line will intersect the braking line and then closely follow the same.

FIG. 4 finally shows a graph line 6 which is parallel to the braking line 3. The configuration of graph line 6 is determined by the design of the servo system. Points along line 6 indicate the maximum retardation of the servo system. The distance between graph lines 6 and line 3 can be adjusted by adding to the filter network a further parallel branch which is purely resistive. The resistance value of this further branch will then determine the changed distance.

The graph lines shown in the figures are based upon the following values of the filter components.

$R_1=300K$ ohms
$R_2=150K$ ohms
$R_{31}=R_{32} \ldots R_{3n}=50K$ ohms
$C=0.2$ μf.
$Vd=0.5$ v.=knee voltage of the rectifier As is apparent, that depending upon the desired characteristic of the braking line 3 in FIG. 4, the data of the circuit components must be determined for each specific case.

If desired, the capacitator C can be connected in parallel to a further parallel resistive branch. Such further branch will determine the capacitance value required for capacitator C.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

According to the present invention the servo system can also use D.-C. error signals. In such a case variable resistances such as rheostats are used as position indicating means.

What is claimed as new and desired to be secured by Letters Patent is:

1. In a servo system having an error signal channel including a derivation network, wherein said derivation network comprises a series branch including a capacitative circuit component and a resistive circuit component connected in parallel and a parallel branch including a circuit component having a non-linear characteristic, said circuit component including two rectifiers connected parallel in opposition and a resistive circuit component connected in series.

2. In a servo system having an error signal channel in which the error signal is in the form of a modulated carrier wave signal and also having a D.-C. section, including a derivation network, wherein said derivation network comprises a series branch including a capacitative circuit component and a resistive circuit component connected in parallel and a parallel branch including a circuit component having a non-linear characteristic, said circuit component including two rectifiers connected parallel in opposition and a resistive circuit component connected in series.

3. A servo system according to claim 1 and further comprising at least one additional branch including a circuit component having a non-linear characteristic and a resistive component connected in series, said additional branch being connected in parallel with the resistive component in the parallel branch.

4. A servo system according to claim 1 and further comprising additional branches each including a circuit component having a non-linear characteristic and a resistive component, each of said additional branches being connected in parallel with the resistive component of the preceding parallel branch, the respective one of said additional branches being connected in parallel with the resistive circuit component of the parallel branch of the derivation network.

5. A servo system according to claim 4, wherein all said circuit components having a non-linear characteristic are alike.

6. A servo system according to claim 1, wherein said two rectifiers are identical.

7. A servo system according to claim 1 and further comprising several additional branches each including a circuit component having a non-linear characteristic and a resistive component, each of said additional branches being connected in parallel with the resistive component of the preceding parallel branch, the respective one of said additional branches being connected in parallel with the resistive circuit component of the parallel branch of the derivation network, all said resistive circuit components having the same resistance value.

8. A servo system according to claim 1, wherein said derivation network comprises at least one additional purely resistive branch.

9. A servo system according to claim 1, wherein said parallel branch is connected to the series branch of the derivation network at an intermediate outlet point of the resistive circuit component in said branch.

10. A servo system according to claim 9, wherein the resistive circuit component of said series branch comprises two resistors connected in series, the communication point of said resistors constituting said intermediate outlet point.

11. A servo system according to claim 1, wherein said series branch of the derivation network comprises a capacitative branch and a purely resistive branch connected in parallel.

12. A servo system according to claim 11, wherein the purely resistive branch comprises several resistances connected in parallel.

References Cited in the file of this patent

UNITED STATES PATENTS

| | | |
|---|---|---|
| 2,104,336 | Tuttle | Jan. 4, 1938 |
| 2,163,403 | Meacham | June 20, 1939 |
| 2,663,765 | Biosblanc | Dec. 22, 1953 |
| 2,697,201 | Harder | Dec. 14, 1954 |
| 2,801,383 | Coming et al. | July 30, 1957 |